United States Patent [19]
Friedrickson, Jr. et al.

[11] Patent Number: 4,979,273
[45] Date of Patent: Dec. 25, 1990

[54] ADJUSTABLE CLAMP

[76] Inventors: Paul L. Friedrickson, Jr., 300 - 12th Ave. SW., Altoona, Iowa 50009; C. Dale Hoing, R.R. #2, 4930 NE. 116th St., Mitchellville, Iowa 50169

[21] Appl. No.: 527,074

[22] Filed: May 21, 1990

[51] Int. Cl.$^5$ .............................................. A44B 21/00
[52] U.S. Cl. ........................................ 24/525; 24/514; 24/522; 269/249
[58] Field of Search ................. 24/525, 522, 514, 535, 24/523; 403/338, 374; 248/61; 269/249, 143

[56] References Cited

U.S. PATENT DOCUMENTS

| | | | |
|---|---|---|---|
| 2,061,718 | 11/1936 | Stahl | 24/525 |
| 2,573,913 | 11/1951 | Ki Ku | 24/525 |
| 2,602,358 | 7/1952 | Lile | 269/143 |
| 3,310,302 | 3/1967 | Catalfimo | 269/249 |
| 3,336,642 | 8/1967 | Armacost | 24/263 |
| 3,443,831 | 5/1969 | Grange | 24/525 |
| 3,537,594 | 1/1971 | Lehmann | 144/290 |
| 3,696,653 | 10/1972 | Mojelski | 72/296 |
| 4,497,092 | 2/1985 | Hoshino | 24/514 |
| 4,871,278 | 10/1989 | Gerlach et al. | 403/338 |

*Primary Examiner*—Victor N. Sakran
*Attorney, Agent, or Firm*—Henderson & Sturm

[57] ABSTRACT

A clamp that comprises a clamp column extending upwardly from one end of a base. The clamp column has a first clamping plate at its free end. An adjustment column also extends upwardly from the base and is spaced parallel to the clamp column. The adjustment column includes a threaded section on its free end. A clamp arm is disposed in spaced parallel relationship with the base and the clamp arm includes a second clamping plate in alignment with the first clamping plate. An opening formed through the clamp arm is positioned in alignment with the adjustment column. A shaft that has a lower threaded section extends through the opening in the clamp arm to threadably engage the threaded section of the adjustment column. The shaft is selectively rotated to adjust the spacing between the first and second clamp plates. An over center cam lever has one end element pivotally attached to the top section of the extending above the clamp arm shaft and a second end element forming the hand grip. A cam lobe on the one end element contacts the clamp arm and the lever is movable between a clamping position where the cam lobe exerts clamping force on the clamping arm and a release position where the cam lobe releases the clamping force on the clamping arm.

7 Claims, 2 Drawing Sheets

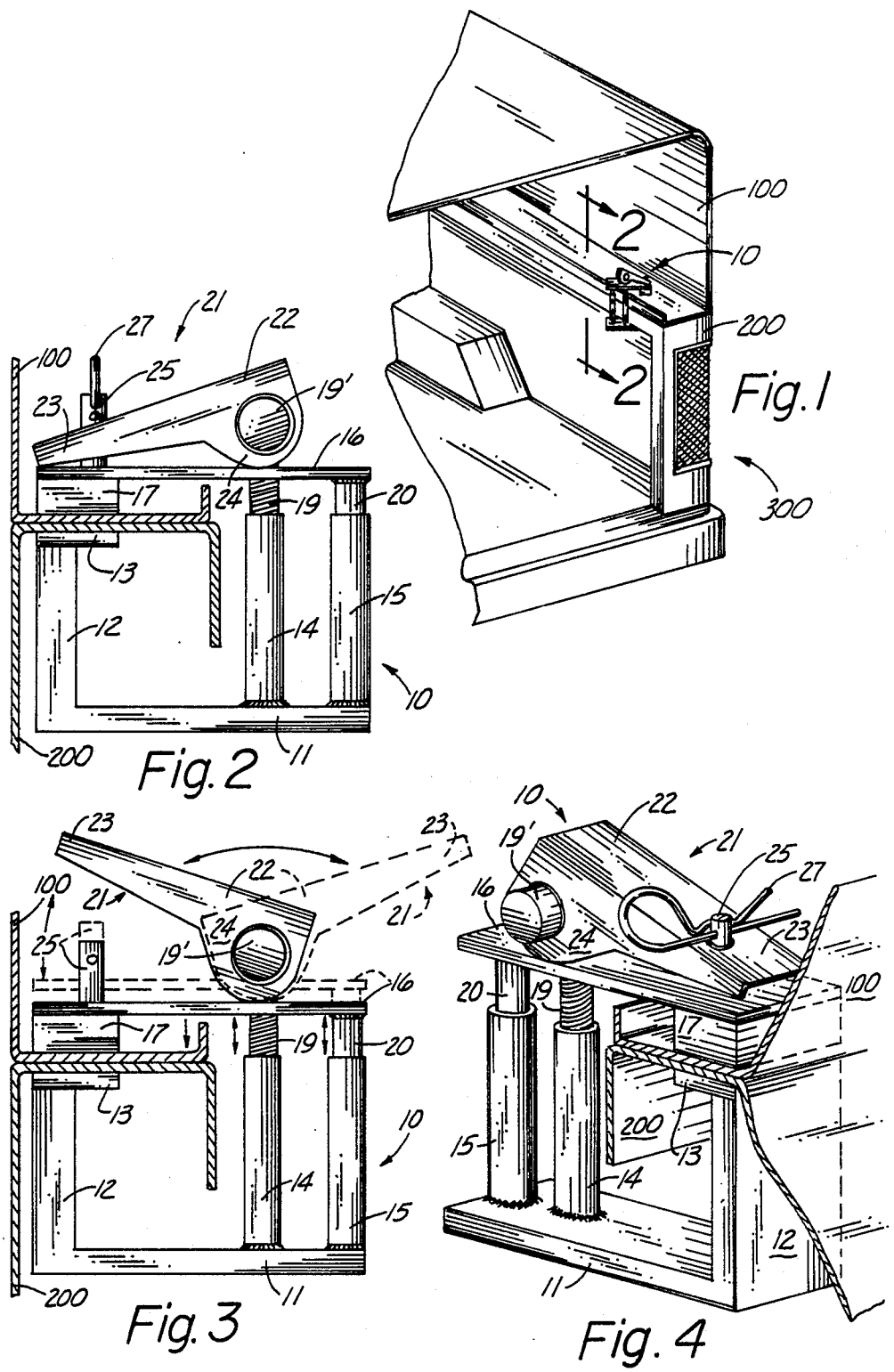

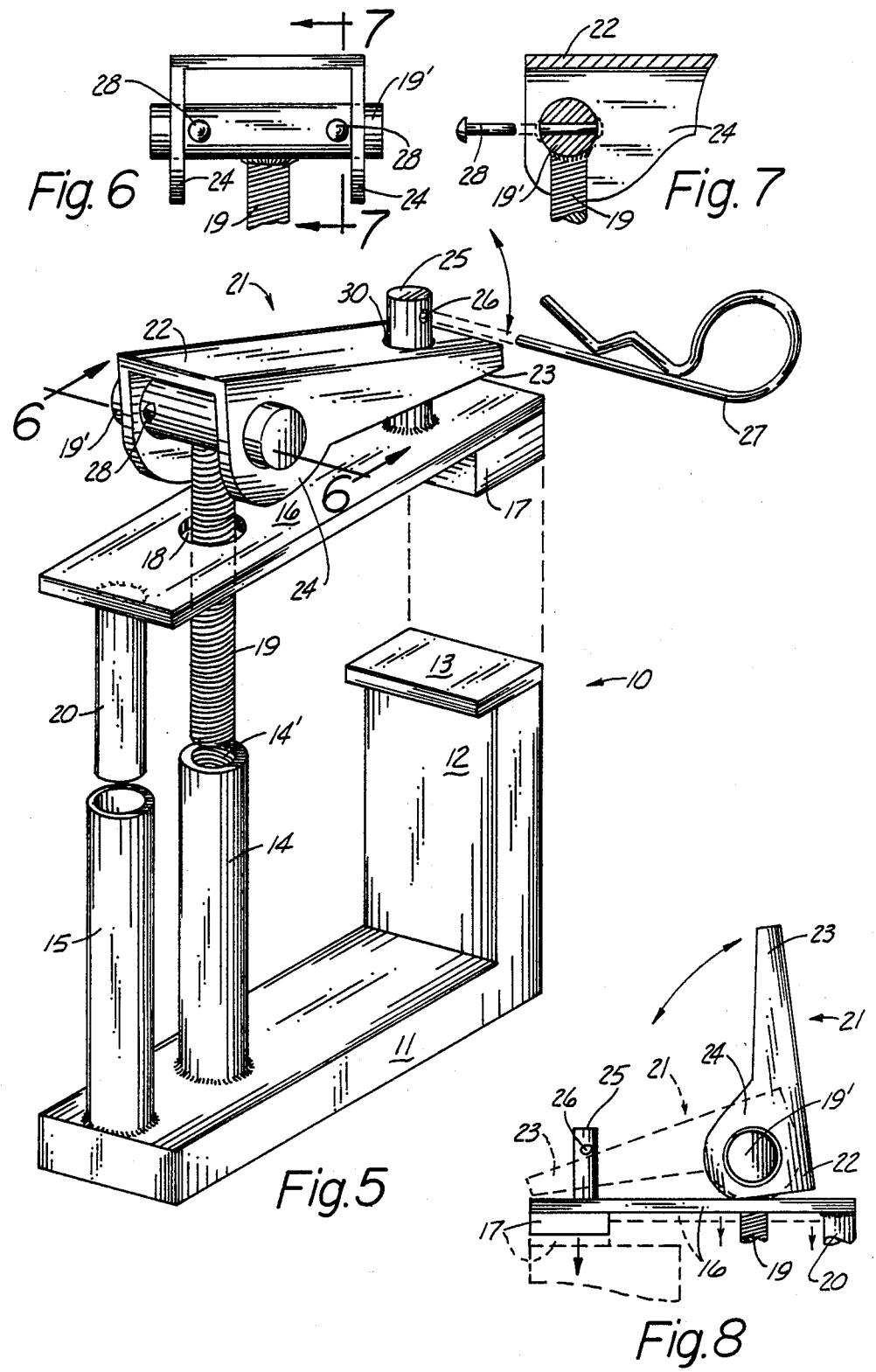

ADJUSTABLE CLAMP

TECHNICAL FIELD

This invention relates to clamping devices, and more particularly to locking clamps.

BACKGROUND ART

There are many devices on the market that secure a topper to a bed of a pickup truck. One such device is a simple "C" clamp. The "C" clamp is clamped onto the lower edges of the topper and the upper side rails of the pickup bed. Not only is this method unsecure as constant movement and friction of the topper against the rails loosen the tightening of the "C" clamp, but scratching occurs with the movement of the "C" clamp as it becomes unsecured. Another method of securement is to drill holes through the lower edge of the topper and the upper edge of the side rails for securement by bolts or the like. Not only is this unsightly if one wants to remove the topper, but the drilling of holes would increase the risk of rust forming in the drilled holes. Another method of securement is a permanent type, such as gluing or welding the topper in place. This method is not suitable if one wants to remove the topper for any reason.

Those concerned with these and other problems recognize the need for an improved clamp for securing a topper unit to the side rails of a pickup truck.

DISCLOSURE OF THE INVENTION

The present invention provides a clamp that comprises a clamp column extending upwardly from one end of a base. The clamp column has a first clamping plate at its free end. An adjustment column also extends upwardly from the base and is spaced parallel to the clamp column. The adjustment column includes a threaded section on its free end. A clamp arm is disposed in spaced parallel relationship with the base and the clamp arm includes a second clamping plate in alignment with the first clamping plate. An opening formed through the clamp arm is positioned in alignment with the adjustment column. A shaft that has a lower threaded section extends through the opening in the clamp arm to threadably engage the threaded section of the adjustment column. The shaft is selectively rotated to adjust the spacing between the first and second clamp plates. An over center cam lever has one end element pivotally attached to the top section extending above the clamp arm shaft and a second end element forming the hand grip. A cam lobe on the one end element contacts the clamp arm and the lever is movable between a clamping position where the cam lobe exerts clamping force on the clamping arm and a release position where the cam lobe releases the clamping force on the clamping arm.

An object of the present invention is the provision of an improved clamp for securely holding a topper to the side rails of a pickup truck.

Another object is to provide a clamp that is easy to use.

A further object of the invention is the provision of a clamp that is simple to manufacture.

Still another object is to provide a clamp that does not mar the surface of the side rails of a pickup truck.

A still further object of the present invention is the provision of a clamp that is reusable on the truck.

BRIEF DESCRIPTION OF THE DRAWINGS

These and other attributes of the invention will become more clear upon a thorough study of the following description of the best mode for carrying out the invention, particularly when reviewed in conjunction with the drawings, wherein:

FIG. 1 is a perspective view of the clamp of the present invention in use securing a topper to the side rails of a pickup truck;

FIG. 2 is an enlarged side elevational view taken along line 2—2 in FIG. 1 showing the clamp locked in the clamping position to hold the topper on the side rail of a pickup truck;

FIG. 3 is a side elevational view of the clamp in an unlocked position with the directional arrows showing the rotation of the lever to adjust the spacing between the clamp plates and showing the vertical movement of the stabilizer rod and the shaft;

FIG. 4 is an enlarged perspective view of the clamp in a fully locked position showing the locking pin in place to prevent movement of the clamp;

FIG. 5 is an exploded perspective view of the clamp showing the orientation of the component parts;

FIG. 6 is an end view of the lever taken along line 6—6 in FIG. 5;

FIG. 7 is a side elevational view taken along line 7—7 of FIG. 6 showing placement of the rivet pin through the pivot shaft; and FIG. 8 is a partial side elevational view of the clamp showing the lever moving between the relative position and the clamping position shown in phantom.

BEST MODE FOR CARRYING OUT THE INVENTION

Referring now to the drawings, wherein like reference numerals designate identical or corresponding parts throughout the several views, FIGS. 4 and 5 show the clamp (10) of the present invention.

Referring to FIGS. 4 and 5, the clamp (10) includes a base (11), a clamp column (12) extending upwardly from one end of the base (11), a first clamping plate (13) securely attached to the free end of the clamp column (12), and an adjustment column (14) with internal threads (14'). The adjustment column (14) extends upwardly from the base (11) and is spaced in parallel relationship with the clamp column (12). A hollow stabilizer column (15) is positioned in spaced parallel relationship to the adjustment column (14) and is secured to and extends upwardly from the base (11). A clamp arm (16) is spaced in parallel relationship to the base (11) and further includes a second clamping plate (17) which is disposed in alignment with the first clamping plate (13). An opening (18) in the clamping arm (16) corresponds in alignment with the adjustment column (14). An externally threaded shaft (19) extends downwardly through the opening (18) of clamp arm (16) to threadably engage the internal threads (14') of the adjustment column (14). A stabilizer rod (20) extends downwardly from the clamp arm (16) and is in spaced parallel relationship with threaded shaft (19). The stabilizer rod (20) engages the interior of stabilizer column (15) when the clamp (10) is used. An over center cam lever (21) has one end (22) pivotally attached to the top section (19') of the threaded shaft (19) by rivet pins (28). The other end (23) of lever (21) is contoured to form a hand grip. The cam lever (21) includes a cam lobe (24) that contacts the clamp arm (16). The lever (21) is movable between a clamping position (FIG. 2) and a release position (FIG. 3), whereby the cam lobe (24) releases the clamping force on the clamping arm (16). A projection (25) extends upwardly from the top of the clamp arm (16) at the end opposite the shaft (19) and has an aperture (26) therethrough for receiving a locking pin (27). An opening (30) in the lever (21) is in alignment with the projection (25).

FIG. 1 depicts the clamp (10) in use securing a topper (100) to the side rails (200) of a pickup truck (300).

FIGS. 2 and 4 show the clamp (10) locked in the clamping position to prevent loosening of the clamp (10) due to vibration of the truck (300).

In use, lever (21) is turned counterclockwise to space the first and second clamping plates (13, 17) at a position that allows their respective engagement of the side rail (200) and the topper (100). When the clamp (10) is in the desired position, lever (21) is then turned clockwise (FIGS. 3 and 8) allowing the first clamping plate (13) and the second clamping plate (17) to draw together to secure the topper (100) to the side rail (200). Threaded shaft (19) is directed downwardly into adjustment column (14) and stabilizer rod (20) is likewise directed downwardly into stabilizer column (15) as the lever (21) is turned. When the desired tightness is achieved, lever (21) is pivoted down, allowing projection (25) to project through aperture (30). As the lever (21) is pivoted down, the over-center cam lobe (24) makes contact with and exerts progressively increasingly downward force on the clamp arm (16). Locking pin (27) is inserted through aperture (26) to hold the lever (21) in a secure, clamping position. Clamps (10) are placed at strategic locations along the topper (100) and side rails (200) of the truck (300) to insure stability of the topper (100) on the truck (300). To remove the topper (100), simply reverse the above steps to remove the clamps (10).

Thus, it can be seen that at least all of the stated objectives have been achieved.

Obviously, many modifications and variations of the present invention are possible in light of the above teachings. It is therefore to be understood that, within the scope of the appended claims, the invention may be practised otherwise than as specifically described.

We claim:

1. A clamp comprising:
   a base;
   a clamp column extending upwardly from one end of said base, said clamp column having a first clamping plate disposed at its free end;
   an adjustment column extending upwardly from said base in spaced parallel relationship with said clamp column, said adjustment column including a threaded section disposed at its free end;
   a clamp arm disposed in spaced parallel relationship with said base, said clamp arm including a second clamping plate disposed in alignment with said first clamping plate, and having an opening formed therethrough disposed in alignment with said adjustment column;
   a shaft including a lower threaded section disposed to extend through the opening in said clamp arm to threadably engage the threaded section of said adjustment column, and a top section disposed above said clamp arm; said shaft being selectively positioned to adjust the spacing between the first and second clamp plates;
   an over center cam lever including one end element pivotally attached to the top section of said shaft and a second end element forming a hand grip, said one end element including a cam lobe disposed to contact the clamp arm, said lever being movable between a clamping position wherein the cam lobe exerts clamping force on the clamping arm and a release position wherein the cam lobe releases the clamping force on the clamping arm.

2. The clamp of claim 1 wherein said adjustment column is an internally threaded tube, and said lower threaded section of said shaft is externally threaded.

3. The clamp of claim 1 further including:
   a stabilizer column extending upwardly from said base in spaced parallel relationship to said adjustment column; and
   a stabilizer rod extending downwardly from said clamp are to slidably engage said stabilizer column.

4. The clamp of claim 3 wherein said stabilizer column is a tube having an internal open bore and said stabilizer rod is telescopically received in said open bore.

5. The clamp of claim 3 wherein said adjustment column is disposed intermediate said clamp column and said stabilizer column.

6. The clamp of claim 1 further including means for locking said lever in the clamping position.

7. The clamp of claim 6 wherein said lever locking means includes:
   a projection extending upwardly from said clamp arm including a pin receiving opening formed therethrough;
   an opening formed through the lever in registry with said projection; and
   a locking pin selectively positioned in said pin receiving opening when the lever is in the clamping position.

* * * * *